United States Patent [19]

Roth et al.

[11] Patent Number: 5,062,589
[45] Date of Patent: Nov. 5, 1991

[54] FIBER REINFORCED PRESSURE BULKHEAD WITH INTEGRATED FRAME

[75] Inventors: Siegfried Roth, Mittelstenweiler; Detlef Benz, Immenstaad; Anton Reichle, Stetten; Reiner Teske, Markdorf; Peter Zimmermann; Peter Hager, both of Friedrichshafen; Josef Mueller, Markdorf; Werner Poenitzsch, Friedrichshafen, all of Fed. Rep. of Germany

[73] Assignee: Dornier Luftfahrt GmbH, Oberpfaffenhofen, Fed. Rep. of Germany

[21] Appl. No.: 485,949

[22] Filed: Feb. 27, 1990

[30] Foreign Application Priority Data

Feb. 28, 1989 [DE] Fed. Rep. of Germany ....... 3906170
Jul. 19, 1989 [DE] Fed. Rep. of Germany ....... 3923871

[51] Int. Cl.$^5$ ............................................. B64C 1/10
[52] U.S. Cl. .................................. 244/117 R; 244/119
[58] Field of Search ............... 244/117 R, 119, 121, 244/133; 114/78, 116; 98/1.5; 220/3, 565, 610; 52/2 N, 222

[56] References Cited

U.S. PATENT DOCUMENTS

| | | | |
|---|---|---|---|
| 1,393,537 | 10/1921 | Jack | 114/78 X |
| 4,011,867 | 3/1977 | Arntzen | 98/1.5 X |
| 4,425,980 | 1/1984 | Miles | 244/119 X |
| 4,539,253 | 9/1985 | Hirschbuehler et al. | 244/119 X |
| 4,728,059 | 3/1988 | Stephen et al. | 244/119 |
| 4,892,214 | 1/1990 | Hamaguchi et al. | 220/3 X |

Primary Examiner—Joseph F. Peters, Jr.
Assistant Examiner—Carla Mattix
Attorney, Agent, or Firm—Ralf H. Siegemund

[57] ABSTRACT

In an aircraft having a cylindrical or tapered pressurized fuselage, an internal bulkhead includes a central calotte shaped part of particular thickness and made of a fiber-mesh, a woven or a fleece-like reinforcement of a particular radius of curvature and preferably made of Kevlar: a possibly thicker edged portion of, preferably, carbon fiber-reinforced material, which possibly matches any taper of the fuselage, and a transition from the calotte shaped part to the edge having a radius of curvature smaller than the particular radius of the calotte shaped partition.

19 Claims, 3 Drawing Sheets

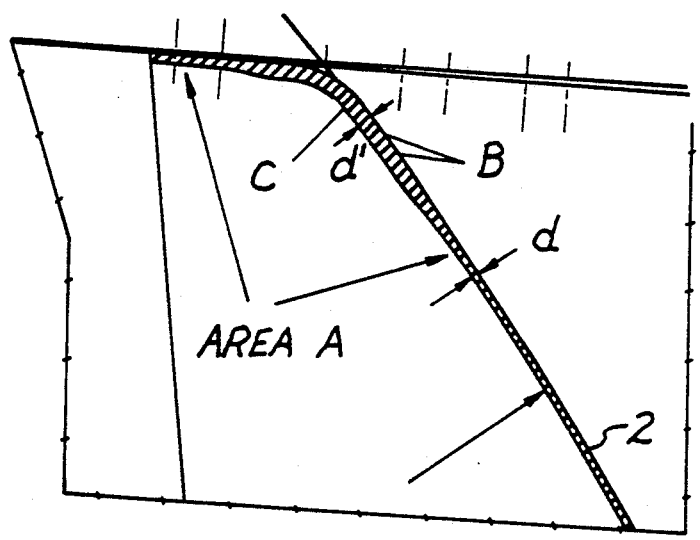
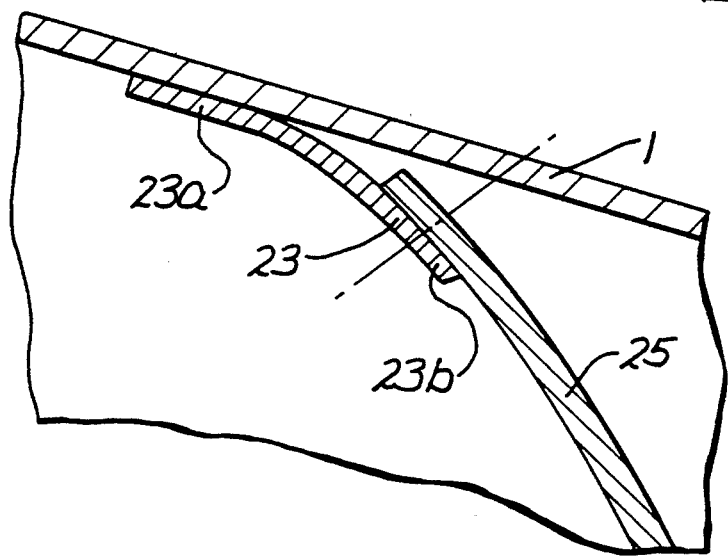
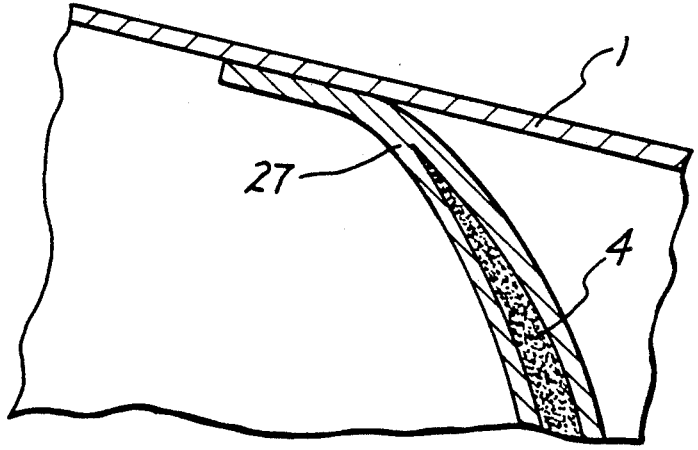

FIBER REINFORCED PRESSURE BULKHEAD WITH INTEGRATED FRAME

BACKGROUND OF THE INVENTION

The present invention relates to a pressure loaded or compression panel, partition, end piece or bulkhead with a frame made of fiber reinforced compound material to be used in a pressurized fuselage in an aircraft.

Bulkheads expected to be exposed to significant pressure differentials constitute, for example, the end portion of a pressurized cell or compartment in an aircraft. They are usually made of aluminum or titanium for different modes of construction or manufacture. For reasons of safety, crack stoppers or crack arresters are included. These are necessary since the metals used for this purpose, though furnished with many well known advantageous properties as far as the aircraft industry is concerned, do nevertheless exhibit certain unfortunate behavioral characteristics such as propagation of cracks or other damage. It is for this reason that aircraft with pressurized fuselages will in the future include pressurized bulkheads consisting largely of metal parts.

The aircraft known as Beechcraft Starship built by the U.S. Beechcraft Corporation has a pressurized fuselage made in its entirety of fiber reinforced materials. The rear end bulkhead is made of a planar laminated sandwich construction which includes a honeycomb core with two cover plants. In order to mechanically stabilize this device two frames are provided on the outside.

DESCRIPTION OF THE INVENTION

It is an object of the present invention to provide a new and improved internal bulkhead structure for aircraft which avoids the problems outlined above, is of light weight, is economically manufactured, easy to install and easily inspectable.

In accordance with the preferred embodiment of the present invention it is suggested to provide such a bulkhead structure in a calotte, elliptical or oval shape with structure that merges smoothly with the geometry of the aircraft and/or its internal cross section having a corresponding matching configuration as far as such a transition is concerned. This partition and panel element is made of fiber reinforced material as is known per se.

In accordance with the invention therefore, what could be described as a monolithic pressure loaded bulkhead is used basically in a calotte shape, with possible oval or elliptical deviations. Such a configuration establishes a component of high stability and uses comparatively little material, thus retaining a low weight. A flat transition element from fuselage skin to the bulkhead is established in order to avoid right angles at the connection. Such an angle is unfavorable as far as fiber material is concerned. Basically it is possible to have a uniform wall thickness of similar material but a different thickness can be provided if the transition is appropriately dealt with. Basically a hybrid construction is feasible within the context of this invention. The edge portion of the bulkhead will experience loads to a significant extent, and here additional lamina of fiber reinforced or reinforcing material are provided, in an integrated configuration and by using stiffer kinds of fiber such as carbon fibers.

In a preferred form of practicing the invention the bulkhead is made of a hybrid configuration meaning that certain areas or zones have material that differ from the material used around the edges, e.g. the center portion membrane may be made of material and in a construction which is basically more elastic than the edge parts. These elastic materials are known, for example, under the name of KEVLAR and are of the kind which can prevent escalation of damage such as cracks, notches, other impacts. In order to avoid the utilization of connecting elements, the bulkhead is cured in an autoclave and is thus completed in situ. The edge portion includes preferably toroidally formed carbon fibers arranged internally.

Fiber reinforced material and compound products do exhibit very favorable properties with respect to impeding the propagation of cracks or other damage. On the basis of a large variety of material that is available for the fiber, on the one hand, and the local host matrix that embeds the fibers on the other hand, such fiber reinforcement permits a large variety of combinations and variations. This, taken in conjunction with the aforementioned in situ curing constitutes a technical composition feature which is highly advantageous as compared with the known metal configuration and its practice. These advantages are as follows.

Manufacturing costs and weight can be reduced. The service life was found to be longer, damage tolerance improved and problems concerning sealing are reduced. Solid edge areas without hidden portions under frame flanges permit ultrasonic inspection. Manufacture and through-put times are shorter and capital investment for manufacturing is low.

As stated, the inventive aircraft bulkhead is basically round and calotte shaped with a stronger curvature near the edges than in the center part so that the edge runs parallel to the fuselage. This in turn means that the fastening is simpler and can be matched to the organic material that is being used. Bonding or riveting can be employed. The edge preferably matches the cross section of the fuselage as well as the geometric contour thereof and can be either cylindrical, i.e. round or conical or elliptical. The conical contour will be particularly chosen for a trailing or rear end portion of the craft since there usually is a tapering configuration provided as far as the fuselage is concerned.

The reinforcement of the edges represents an internal frame and is preferably provided through the embedding of additional fiber layers. Here one should use fibers which allow compression stresses such as carbon fibers. The edge may be twice as thick as the calotte panel is in the center membrane area. Thickening and strengthening may of course be provided in other areas, points or locations if that is necessary. Depending on the particular demands and requirements, one could use stringers or section pieces as reinforcement. Such a supplemental reinforcement may be provided by adding on stringers or section pieces, or fillers such as fiber fleece or foam material embedded in various layers constituting the fiber reinforced compound material so that the particular part becomes thicker and stiffer. On the other hand, and particularly through the appropriate choice of material, the added weight along the edges are offset by choice of material and a strengthened though thinner central panel or bulkhead portion.

As far as the fibers are concerned, various configurations can be used, particularly mesh woven or braided but also unidirectional configurations of fibers in a mat-like structure. The various layers may be twisted in relation to each other so that the fiber orientation of one layer has an angle to those of adjusting layers which, in terms of the configuration, seem to intersect in a geometric projection the fiber directions in other layers. By using this principle an overall homogeneous configuration obtains. Of course basically each layer, lamina or stratum can be made differently from any other layer and thereby provide the various adaptations to different problems so that mesh portions can be combined with unidirectionally oriented fiber arrangements.

Conceivably the major i.e. central part of the calotte is made of a mesh structure as far as the reinforcing fibers are concerned. Any reinforcing edges such as annuli are reinforced with unidirectional (peripherally) extending fibers. As far as the fiber material is concerned, a large variety is known as far as the resin as host material is concerned, and has already been used in the aircraft industry. Particularly advantageous is the material known under the name KEVLAR which will be used for the center part of the calotte and also for the edge portions because of its high ductility and favorable elasticity. The overall test is of course the strength resulting from the chosen material on the one hand, and how it tolerates damage on the other hand. Here one may want to use carbon fibers along the edges in order to absorb compression stresses.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which;

FIG. 3b illustrates again a detail; and

FIGS. 4 and 5 are cross sections through examples for different edge portions and basically in a similar overall construction as far as FIG. 1 is concerned, but showing different configurations in edge construction and reinforcement;

Figure 1:
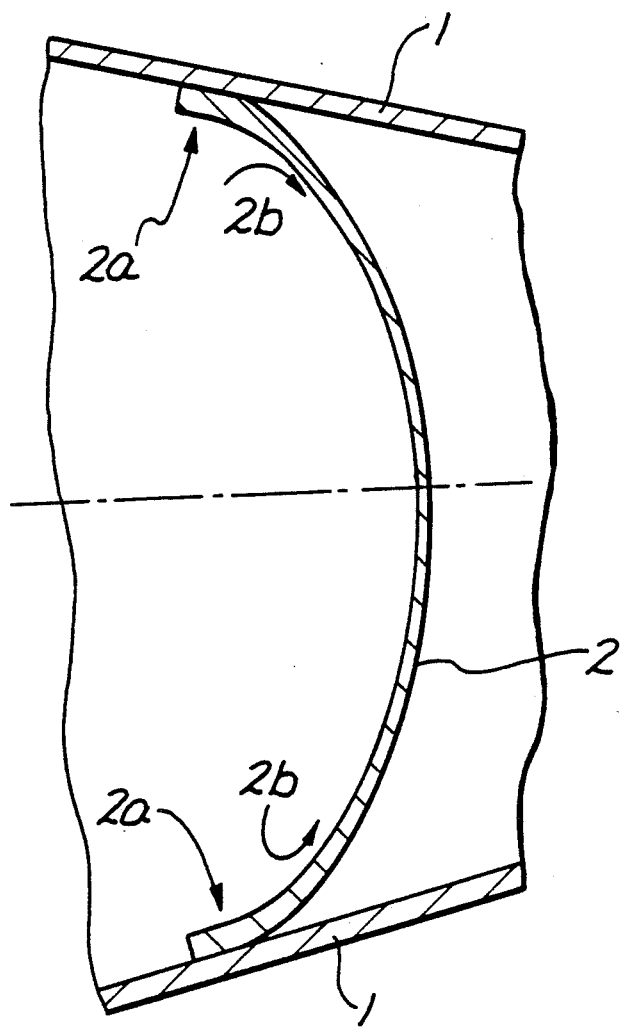
FIG. 1 is a cross section through a portion of a fuselage in an aircraft showing practicing the invention in accordance with the preferred embodiment under best mode considerations.
Figure 2:
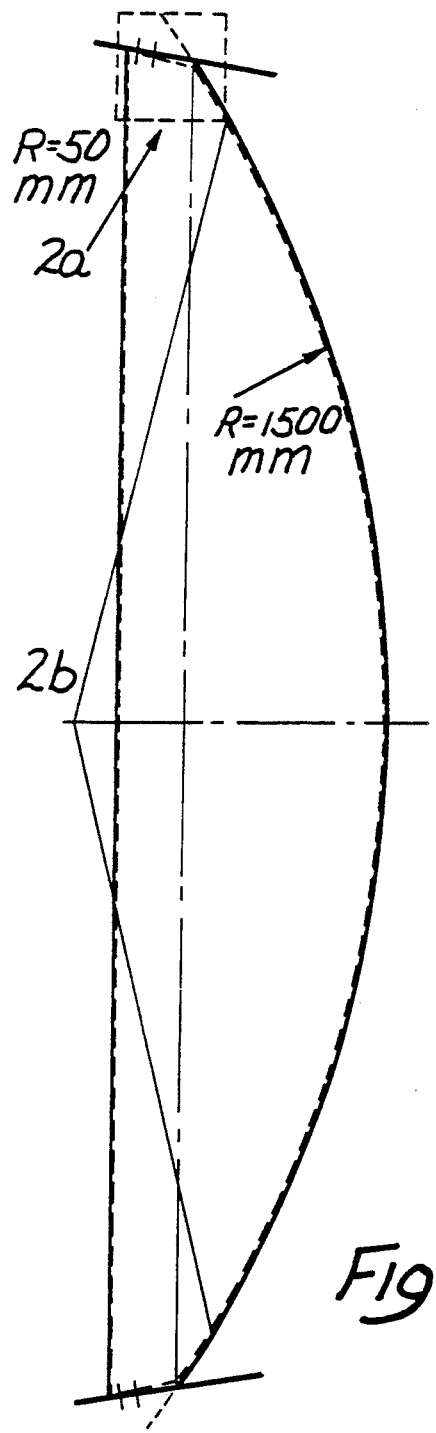
FIG. 2 illustrates the geometric conditions for an aircraft bulkhead that may have to take up significant pressure differentials and is to be used for practicing the invention in accordance with FIG. 1.

Proceeding now to the detailed description of the drawings, FIG. 1 as stated shows a section through a portion of the fuselage 1 of an aircraft where the fuselage configuration basically tapers rearwardly along the center axis of the craft. A bulkhead element 2 that is included has a calotte shape in accordance with the invention and its concave side faces the pressurized cabin or interior of the craft; this, of course, is to the left. The bulkhead 2 may have to take up significant pressure differentials and has a certain thickness distribution; where the edge portions 2a are thicker than the central and major portion 2b of this bulkhead. In addition, the edge portions 2a differ from the calotte shape to provide a geometrically smoothly merging transition to the tapering contour of the craft 1. The ultimate edge portion runs strictly parallel to the local fuselage portion so that fastening through riveting, bonding or the like is relatively easy.

As stated, the edge parts 2a of the bulkhead 2 are reinforced with fiber material which are embedded accordingly to thus prepare the frame. In a practical case the bulkhead 2 being a panel or internal partition of the aircraft has an overall diameter of about 1950 mm with a radius of curvature in the center of about 1500 mm while the transition element to the tapered potions has a curvature of 50 mm and is provided with additional reinforcements for a length of about 250 mm. The center of the bulkhead 2b is basically constructed of symmetrical layers of kevlar and in the edge portion 2a there are added internal unidirectional layers or lamina of carbon fibers.

One could modify or change the construction by including stiffenings which are not shown but they can be provided if there is a need. For this one may integrate additional fiber resin layers which provide local thickening or one may add stringers or additional panels or internal partitions or sections of any kind. The adding on and in situ curing may include the adding of conventional bonding material and the connection to the fuselage or portion may also be in situ under utilization of bonding or riveting. In the case of a calotte shaped bulkhead, additional stiffening section pieces extending in radial direction should be provided on the convex side of the elements 2. One may, e.g. provide additional radial stiffenings but without extending all the way to the center leading to the edge portion.

Figure 3A:
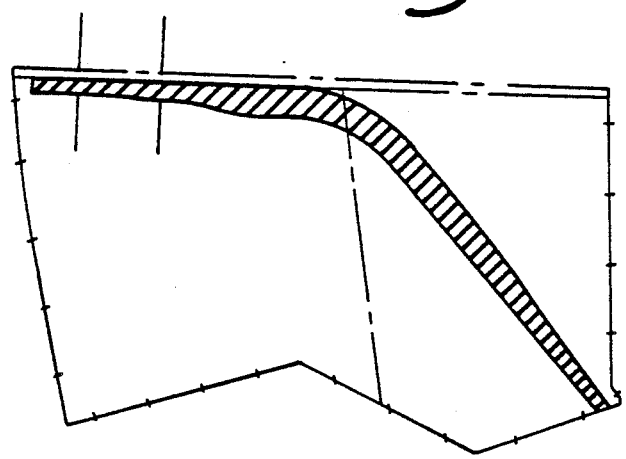
FIG. 3a illustrates a detail on an enlarged scale.

Proceeding to the description of certain details FIG. 3a shows a more geometric representation of a bulkhead 2 having a radius of curvature of 1500 mm as shown. The edge portion is more curved and more highly reinforced. The radius is reduced to 50 mm in the transition portion merging into what is essentially a conical part. The calotte 2b has, by way of example, a layered configuration and construction which is comprised of 50% SFK, also called KEVLAR, in peripheral direction and 50% KEVLAR in radial direction. The edge portion 2a includes the KEVLAR configuration but with internal carbon fiber reinforcement representing an internal frame.

FIG. 3b illustrates basically a similar configuration as shown in FIG. 3a except that here there is further differentiation provided for explaining the mechanical system: The edge portion has been separated and divided into three parts, A, B, C. The part A is only under membrane state of stress which is taken up by KEVLAR fibers corresponding to a particular stress formula in a peripheral and longitudinal direction. The area B is loaded similarly to A, and additionally a bending stress is superimposed on the KEVLAR fibers. For this the thickness is increased from d to d' in order to provide a proper resistance moment. The KEVLAR fibers will be put under compression stress to a minor extent.

The area C however is under compression stress and it includes carbon fibers looping unidirectionally in peripheral direction. Owing to the differences in stiffness of the KEVLAR calotte on one hand and the carbon fiber reinforcement on the other hand, the concentrical support forces can be taken up by the integrated edge annulus (frame). In fact, in conjunction with the peripheral forces in the edge of the annulus they establish a system that is statically in equilibrium FIG. 3b is illustrative of the inventive concept of utilizing different kinds of fibers so as to benefit from the specific properties of each fiber and to optimize the over-all effectiveness of the fiber reinforced compound. A separate stiffening frame is avoided, and instead the compound as such is made stiffer.

The bulkhead 25 shown in FIG. 4 shows a transition piece 23 which is separate and separately bonded to the fuselage 1. Here the panel or internal partition 25 in its entirety is of calotte shape and the transition piece 23 is on one hand provided with a bend portion to a taper 23a that matches the contour of the fuselage 1 while the other portion 23b is provided in a configuration that follows the calotte 25. The fastening of parts 25 and 23 together is illustrated by the dash dot line and may either be obtained through bonding, riveting or the like.

The bulkhead 27 shown in FIG. 5 actually shows a thickened calotte center part but the thickening obtains through the inclusion of a fleece or foam material or honeycomb or other similar hollow reinforcements 4. Owing to the increase in thickness the stiffness is considerably increased, the hollow construction as such minimizes the weight increase and the material itself can also be of light weight.

Another aspect to be considered is that the material should be nonflamable, i.e. it should not be prone to combustion or at least very difficult to combust. This is particularly true for the carbon fibers which means that the particular bulkhead can be used as a gate or a bulkhead of other partitioning. The invention is not limited to the embodiments described above but all changes and modifications thereof, not constituting departures from the spirit and scope of the invention, are intended to be included.

We claim:

1. Pressure loaded aircraft bulkhead element, internal aircraft partition element or end element in an aircraft and for utilization in a pressurized environment: the element being made of fiber reinforced material and being of a calotte contour with a center part and a transition of round, oval or elliptical configuration at or near an edge portion; and the edge portion including additional carbon fiber reinforcing layer means.

2. Element as in claim 1, the edge portion being cylindrical, conical or elliptical.

3. Element as in claim 1, the fibers being of uniform configuration and material selection.

4. Element as in claim 1, using different kinds of fibers.

5. Element as in claim 1, including different kinds of fibers and different layers.

6. Element as in claim 1, being comprised of integral monolithic configuration having been cured in situ in its entirety.

7. Element as in claim 1, wherein fibers run in circular annular configuration in the edge portion, representing a circular internal frame.

8. Element as in claim 1, including a filler of open construction such as fleece, a foam, or a honeycomb configuration.

9. Element as in claim 1, including the utilization of fiber mesh lamina.

10. Element as in claim 1, including the utilization of uniformly extending fibers at least in certain portions of the bulkhead.

11. Element as in claim 1, including a separate transition piece from the calotte shape to the interior of the vessel.

12. In an aircraft having a pressurized fuselage, a pressure bulkhead in a tapered portion of the fuselage of the craft comprising:

a central calotte shaped partition of particular thickness and made of a fiber-mesh, a weave, or a fleece-like reinforcement of a particular radius of curvature;

a tapering edge portion of stiff carbon fiber reinforced material matching the taper of the fuselage; and a transition from the calotte shaped partition to the edge having a radius of curvature smaller than the particular radius of the calotte shaped partition.

13. The partition as in claim 12, the edge portion being thicker.

14. The partition as in claim 13, the edge portion having or including different fibers.

15. The partition as in claim 13, the fibers in the edge portion looping around.

16. In an aircraft having a pressurized fuselage and an internal bulkhead in a tapered portion of the fuselage of the craft comprising:

a central calotte shaped partition of particular thickness and made of a fiber-mesh, a weave or a fleece-like reinforcement of a particular radius of curvature;

a cylindrical edge portion of stiff carbon fiber reinforced material matching the contour of the fuselage; and a transition from the calotte shaped partition to the edge having a radius of curvature smaller than the particular radius of the calotte shaped partition.

17. The partition as in claim 16, the edge portion being thicker.

18. The partition as in claim 17, the edge portion having or including different fibers.

19. The partition as in claim 17, the fibers in the edge portion looping around.

* * * * *